Nov. 23, 1965  C. D. GLOVER  3,219,062
EJECTOR VALVE
Original Filed June 3, 1962  3 Sheets-Sheet 1

INVENTOR.
CLARENCE D. GLOVER
BY
*Adams, Forward & McLean*
ATTORNEYS.

Nov. 23, 1965  C. D. GLOVER  3,219,062
EJECTOR VALVE

Original Filed June 3, 1962  3 Sheets-Sheet 2

INVENTOR.
CLARENCE D. GLOVER
BY
Adams, Forward & McLean
ATTORNEYS.

Nov. 23, 1965  C. D. GLOVER  3,219,062
EJECTOR VALVE
Original Filed June 3, 1962  3 Sheets-Sheet 3

INVENTOR.
CLARENCE D. GLOVER
BY
*Adams, Forward & McLean*
ATTORNEYS.

United States Patent Office 3,219,062
Patented Nov. 23, 1965

3,219,062
EJECTOR VALVE
Clarence D. Glover, Tampa, Fla., assignor to Hydro-Centura Engineering, Inc., Gibsonton, Fla., a corporation of Florida
Original application June 3, 1962, Ser. No. 202,209, now Patent No. 3,118,609, dated Jan. 21, 1964. Divided and this application Apr. 15, 1963, Ser. No. 273,230
3 Claims. (Cl. 137—625.22)

This is a division of application Serial No. 202,209, filed June 13, 1962, now Patent No. 3,118,609.

This invention is directed to a sprinkling device which can, for instance, be built into a system for lawn or garden watering.

It is customary practice to install pipes below ground level in a lawn or garden in order to distribute water throughout the area. These pipes communicate with sprinkling devices which are conveniently spaced over the ground area to be watered. For most effective watering the sprinkler mechanisms must extend generally vertically from the underground pipes to above the ground or grass level. The upper ends of the sprinkling devices when so located are unsightly or troublesome to persons traveling through the area or a nuisance or even dangerous to the operation of equipment such as lawn mowers over the ground.

For these reasons a number of sprinkling devices have been proposed which have the ability to be extended, when use is desired, from a retracted position near or below the ground or grass-cutting level to the more effective extended position above the ground or grassy location to be watered. Such devices, however, frequently leak water, exhibit short life, fail to elevate or retract or have other undesirable features.

In the present invention I have devised a simply constructed sprinkling device which is highly efficient in operation and is of rugged construction with positive sealing means to prevent leakage. An important feature of the instant invention is the provision made for extension of the sprinkler head from at or below ground level and its retraction to or below ground level by hydraulic forces without the need for the sprinkling water to lose a great deal of its force by working against heavy spring pressures after extension is achieved. My invention allows for repair or replacement when necessary with a minimum of time and expense. My sprinkling device is brought to the extended position by water pressure in the underground distribution system and the device may be retracted when no longer in use by removal of water from the distribution system through suction. Also if necessary or desirable, the device can be retracted by exerting pressure on the sprinkling head from above ground level. The present invention also provides an especially designed ejector valve which can reverse the pressure on the sprinkler head to cause or assist retraction of the sprinkling head to below ground level.

In my invention the elevation or retraction of the sprinkler head is caused by the operation of positive or negative hydraulic pressures acting upon the underside of a piston to which the sprinkler head is operatively attached. The piston is provided with holes for travel of the water between upper and lower chambers of the sprinkler mechanism and means are provided to prevent significant passage of water between these chambers except through the piston. A valving arrangement is provided to prevent flow of water through the piston until the sprayer head reaches its extended, operating position, and a washer placed atop the piston acts to prevent fluid flow between the chambers when the sprinkler head is being lowered by negative hydraulic pressure.

My invention will be better understood when described in conjunction with the accompanying drawings wherein FIGURE 1 is a side view, partially in section, of my sprinkling device connected to an underground water pipe;

Figure 1:
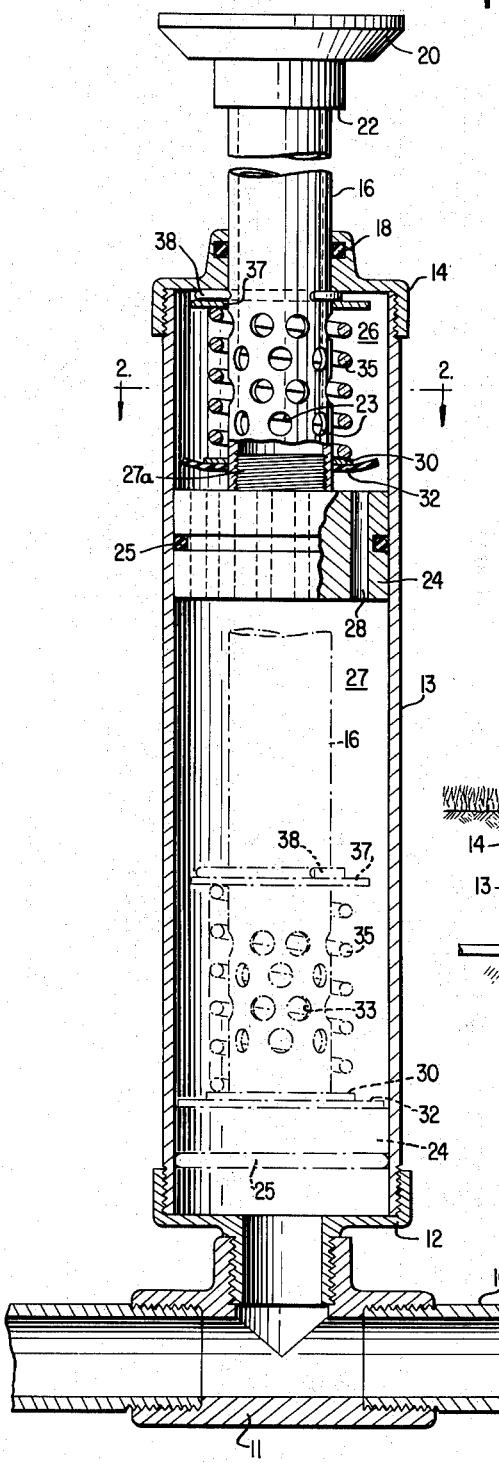
Figure 2:
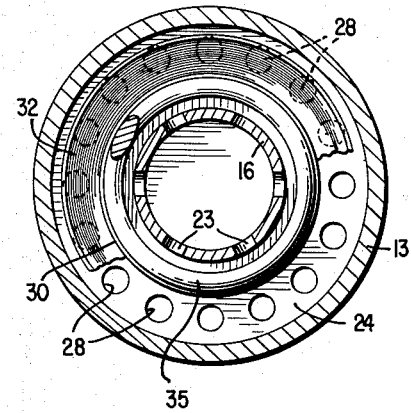
FIGURE 2 is a cross-sectional view of this invention taken along line 2—2 of FIGURE 1.

Referring especially to FIGURES 1 and 2, I have shown horizontal, underground water pipe 10 having placed therein the T-joint 11 so that its vertical section points upward. Threaded within the upper end of T-joint 11 is lower housing member 12. Threaded to member 12 is hollow cylinder 13 which extends in a vertical direction toward the surface of the ground. Cap 14 is threaded around cylinder 13 and the upper end of cap 14 slidingly holds hollow tube 16 which is provided with a seal for example, the O-ring 18 which is positioned in the upper neck of cap 14 to prevent water leakage from within the cylinder. Hollow tube 16 carries on its upper end a perforated water outlet or spray head 20 and shoulder 22 is placed between head 20 and tube 16. Tube 16 is provided at its lower end with holes 23.

The extension and retraction mechanism of my sprinkling device is housed within cylinder 13 and in FIGURE 1 the extended position is shown in solid lines and the retracted position in phantom lines. The lower end of tube 16 is connected to piston 24 which is a metal cylinder slidingly held within cylinder 13 with a seal, for example, the O-ring 25 which is provided in the circumference of piston 24 to prevent water leakage past the cylinder. The piston divides cylinder 13 into upper chamber 26 and lower chamber 27. Radially positioned in the piston 24 are a plurality of through passageways 28 communicating with the upper and lower surfaces of piston 24. Metal washer 30 is placed on top of washer 32 which usually fits somewhat snugly against tube 16 and extends radially beyond all of the passageways 28 in order to seal the fluid passage through the piston 24. As shown, the washer 32 may be made of a resilient or flexible material such as rubber or leather which will provide a raisable lip portion for opening passages 28 when the lip portion is raised or for sealing action against the passages 28 when this lip portion is horizontal.

Spring 35 is loosely coiled around tube 16 and is held between lower washer 30 and upper washer 37, the latter loosely surrounding tube 16 above spring 35. The vertical movement of washer 37 is restricted by cotter pin 38 extending through the mid portion of tube 16. It can be seen therefore, that cotter pin 38 and spring 35 serve to hold the washer 32 against the top of piston 24 and that this washer may be raised from the holes 28. Where washer 32 is sufficiently flexible, the spring 35 may be eliminated and washer 30 firmly attached to tube 16.

Figure 3:
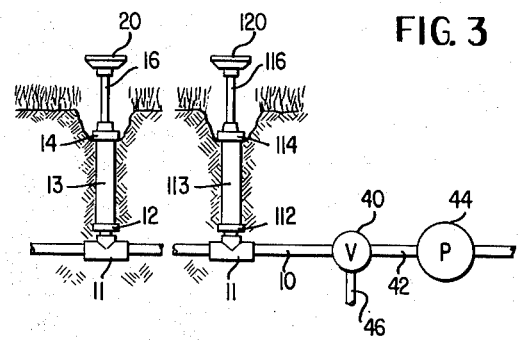
FIGURE 3 is a diagrammatical sketch showing a plurality of the sprinkling devices and a water distribution system equipped with the water access valve of this invention.
Figure 5:
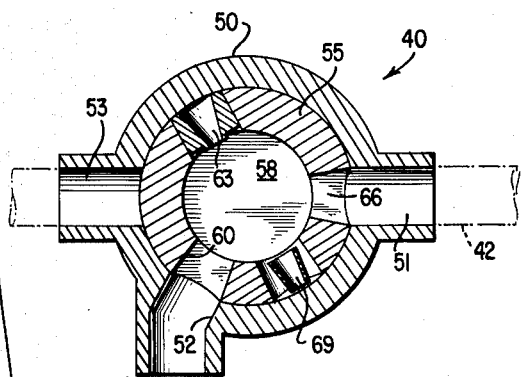
FIGURES 5, 6 and 7 illustrate the various positions of the water ejection valve.
Figure 4:
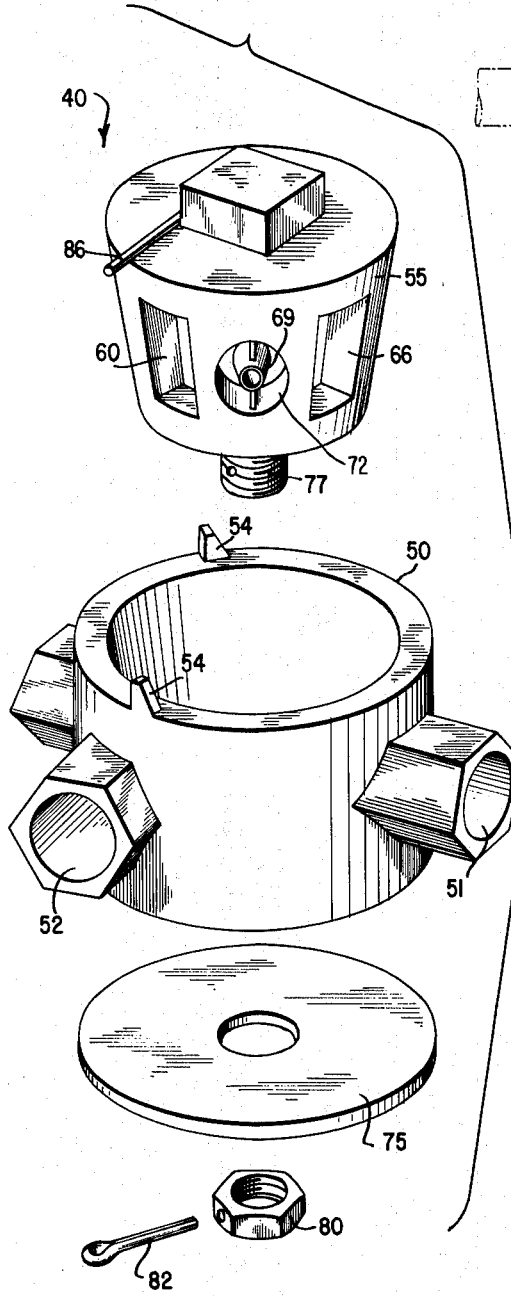
FIGURE 4 is an exploded view of a water ejection valve.
Figure 6:
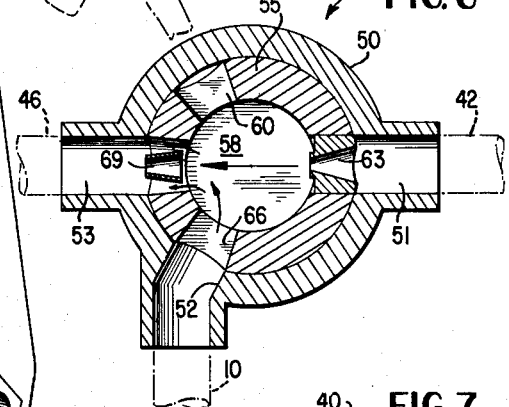

In FIGURE 3 I have illustrated a plurality of my sprinkler devices attached to pipe 10 in a water distribution system equipped with ejector valve 40, thus, water under pressure enters the system by way of pipe 42, from a suitable source of pressure 44 and passes through valve 40 into line 10 before being discharged through my sprinkling device. Valve 40 also can divert water to pipe 46 to drain the system 10 of water.

FIGURES 4–7 describe the suitable ejector valve and its mode of operation. The ejector valve is composed of annular, inwardly tapered body 50 which receives inlet pipe 42 at passage 51, water distribution pipe 10 at passage 52 and outlet pipe 46 at passage 53. It will be noted that passages 51 and 52 are located at an angle of 120° to each other, while passage 53 is 180° from passage 51. Upstanding projections 54 are positioned on the upper edge of body 50. Rotor 55 also has an inward taper which enables it to fit snugly within the body 50. Rotor 55 is provided with the central passageway 58 which communicates with ducts 60, 63 and 66 which are, for instance, equally spaced around the valve body with horizontal axes 120° apart, and with duct 69. Duct 63 is nozzle shaped, with a constricted opening to the passageway 58. At the mid-point between ducts 60 and 66 is placed tapered duct 69 which is within larger duct 72. Duct 69 has its larger end opening to passageway 58 and is placed directly and radially opposite duct 63 and with a smaller end of duct 69 opening to the outside of body 55.

Cap 75 is held on the bottom of body 50 and in turn holds rotor 55 within the body 50 to provide sealing engagement. The ejector valve is held together by bolt 77 which is fastened to the underside of rotor 55 and has on its lower end lock nut 80 which is held by cotter pin 82. Turning operator 84 is fastened to the top of rotor 55 as is the stop-rod 86 which moves horizontally around body 50 between upstanding members 54. When operator 84 is actuated it turns stop rod 86, rotor 55, bolt 77, lower cover plate 75 and lock nut 80. Upstanding members 54 are located so that the rotational movement of handle 86 and its accompanying parts is limited to an arc of about 120°.

Figure 8:
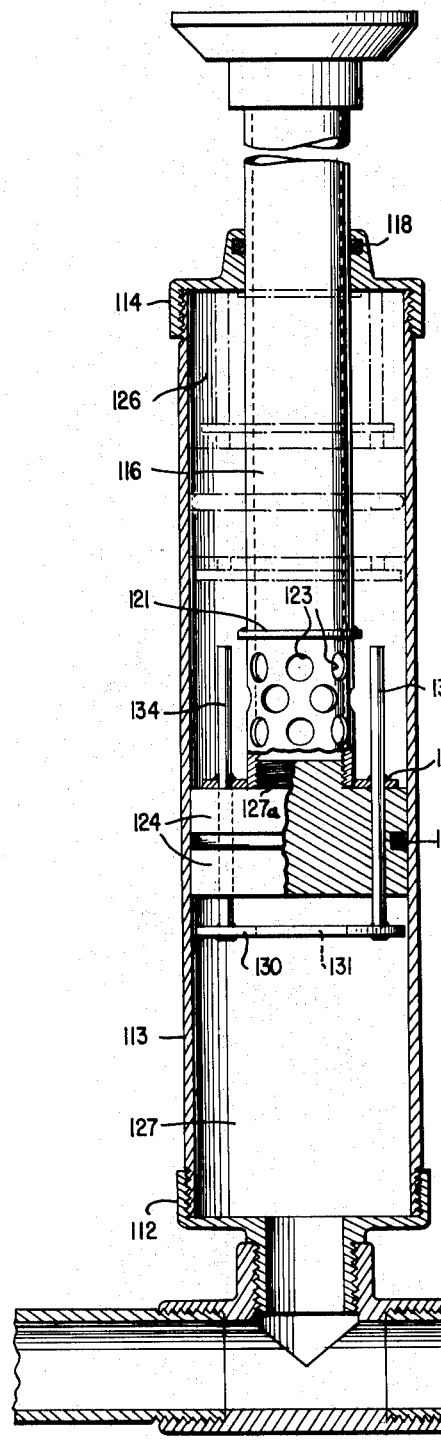
FIGURE 8 is a side view, partly on section, of a preferred modification of my sprinkling device.
Figure 9:
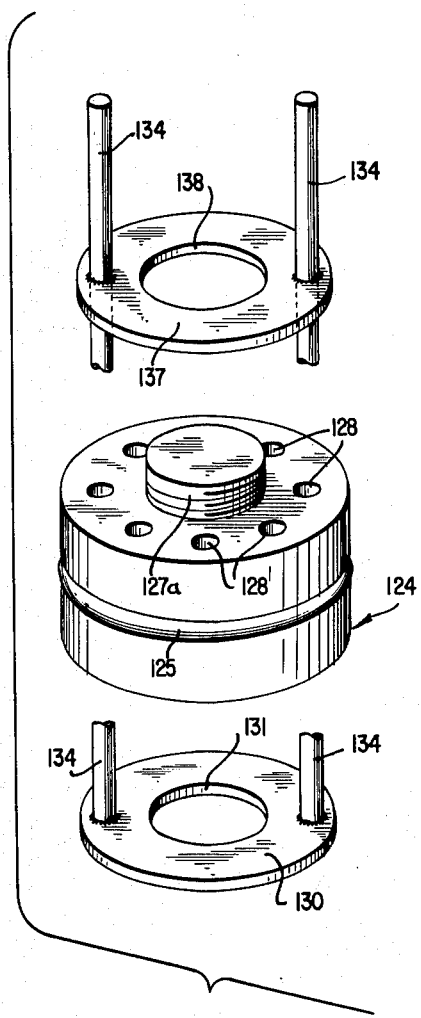
FIGURE 9 is an exploded view of the piston and valve-cage arrangement of the modification of FIGURE 8.

In the embodiment of my invention shown in figures 8 and 9, lower housing member 112 has threaded to it the hollow cylinder 113 which has, at its upper end, cap 114, which slidingly holds hollow tube 116, which is provided with the seal 118 in the neck of cap 114. Tube 116 is provided along its length with the stop ring 121 and at its lower end with holes 123. The piston 124 is provided with circumferential seal 125. This piston divides cylinder 113 into upper chamber 126 and lower chamber 127 and is threaded internally to tube 116 by the center core 127. Piston 124 is provided with the plurality of radially positioned vertical passageways 128. A lower washer 130 having the central opening 131 supports and is rigidly fastened to the rods 134 which generally are 180° opposite each other on the washer 130 and which pass upward through an opposite pair of holes 128. The washer 130 is slightly smaller in diameter than piston 124 and the hole 131 is not large enough to prevent the washer 130 from covering the entrance to holes 128 when in contact with the bottom of piston 124. Above the piston, washer 137, is fastened to rods 134 while permitting the rods to pass through. This upper washer is generally smaller in diameter than lower washer 130 and has a hole 138 in its center slightly larger than the tube 116 which passes through this hole. Washer 137 has dimensions sufficient to cover the top of passages 128.

The combination of the washers 130 and 137 with the rods 134 forms a valve cage and the "looseness" of this valve cage is correlated with the upward extension of the rods 134, the position of the stop-ring 121 on the tube 116, and the bottom configuration of cap 114. The "looseness" of the valve cage formed by washers 130 and 137 and rods 134 is the distance from either of the washers to the piston 124 when the other washer is in contact with the piston. In operative lawn sprinkling position it is desired to have about half this clearance on either side of the piston 124. Therefore the upward extension of the rods 134 above the upper surface of washer 137 will desirably be less than the distance from the top of washer 137 to the stop-ring 121 when the valve cage is in the "down" position shown in FIGURE 8, that is, where the washer 137 is in contact with the top of piston 124. Also in the "up" position, where washer 130 is in contact with the bottom of piston 124, the rods 134 extend slightly above the stop-ring 121. Ideally, when the cap 114 has a flat bottom section in contact with the inside of cylinder 113, the difference between the vertical extension of rods 134 and the stop-ring 121 will be about one-half the looseness of the valve cage, so that when the piston is in its elevated position, held a certain distance from cap 114 by the stop-ring 121, the valve cage will be held by cap 114 and rods 134 away from both the top and bottom of piston 124, allowing flow of water through the hole 131 and passages 128 and around the washer 137 into the holes 123 and the interior of tube 116.

Figure 7:
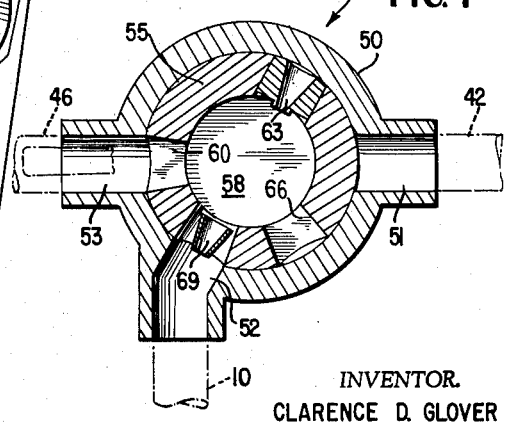

The operation of my sprinkling device is as follows:

When inoperative, piston 24 or 124 is in the position shown in FIGURE 8 and in phantom lines in FIGURE 1 and the rotor 55 of valve 40 is in the cut-off position of FIGURE 7, with the stop-rod 86 midway between the stops 54. Movement of the rotor 60° counter-clockwise turns the rotor 55 to the position shown in FIGURE 5 and water flows from line 42 through opening 51, duct 66, chamber 58, duct 60 and opening 52 to distribution line 10. Water in line 10 enters T-joint 11 and end-cap 12 or 112 into chamber 27 or 127 below the piston 24 or 124.

Water is prevented from passing through holes 28 in piston 24 by the washer 32 which is held down by spring 35. The pressure of the water acts against the bottom of piston 24 to push it, and with it, tube 16 and sprinkler head 20 to the extended position which is achieved when cotter pin 38 comes in contact with the bottom of cap 14. Thus travel of tube 16 and piston 24 is curtailed. Continued pressure of water through holes 28 against the underside of washer 32 raises this washer off the top of passageway 28. This raising may be performed by overcoming the resilient action of the washer 32 itself or by overcoming the pressure of spring 35 or by a combination of the two effects. The movement of washer 32, or at least of its lip, is sufficient to allow passage of water into chamber 26 from the holes 28 and thence passage of water through the holes 23 into the interior of tube 16 and out through the sprinkler head 20.

In the other sprinkler modification, water entering chamber 127 impinges on the bottom of washer 130, causing the valve cage to lift, covering the holes 128 of the piston 124 with the solid portion of the washer 130. Continued pressure of water causes the piston 124, along with tube 116 and the valve cage, to rise to the extended position, putting the spray head above the ground and grass level. Near the limit of extension of tube 116, the rods 134 contact the bottom of cap 114 and upward motion of the valve cage stops while extension of the tube 16 continues for a space of about half the looseness of the valve cage, until stop-ring 121 contacts the bottom of cap 114. In this position both washers 130 and 137 are held away from the piston 124 so that water may flow from chamber 127 through hole 131 and passages 128 to chamber 126 and through holes 123 to the interior of tube 116 to the sprinkler head 120.

It will be noted that essentially all of the water passing through the cylinders 13 and 113 during sprinkling must pass through the pistons and valve arrangements. When sprinkling is finished the rotor 55 may be turned clockwise 120° to put stop-member 86 in contact with the other stop 54. This motion puts the rotor 55 of valve 40 in the position shown in FIGURE 6. Flow of water continues in line 42 and hole 51 but the water passes through duct 63 to chamber 58. The added velocity given the water by the tapered form of duct 63 causes water to flow directly across chamber 58 to the duct 69, hole 53 and exhaust line 46. The Venturi effect of this water passage causes suction or negative hydraulic pressure in line 10, drawing water out of this distribution line to exhaust line 46. The suction pulls water from chambers 27 and 127 of the sprinkler devices back into line 10.

In cylinder 13 removal of pressure allows the spring 35 to push washer 32 against the top of piston 24 or the resilience of washer 32 to push its lip against the top of the piston sealing passages 28, and thereby preventing water from chamber 26 or air from outside the system from entering chamber 27. Continued vacuum causes the piston 24 to descend to the retracted position putting sprinkler head 20 below the grass-mowing level. Likewise in cylinder 113, vacuum from the line 10 pulls down on the valve cage, causing washer 137 to contact the top of piston 124, preventing water from chamber 126 or air from outside the system from getting into chamber 127. Thus piston 124 and sprinkler head 120 is pulled down to retracted position.

It will be noted also that in the "off" position of the valve 40 shown in FIGURE 7 a passage is provided between distribution line 10 and exhaust line 46, thereby permitting water to drain from cylinders 13 and 113 when it is desired to cause retraction of sprinkler heads 20 and 120 by application of mechanical pressure from outside the system. Also the yielding nature of the valving mechanism around piston 24 allows for the application of mechanical retraction pressure due to the resilience of spring 35 and washer 32. It will be noted also that both sprinkler modifications may be used in the same system, if desired.

What is claimed:
1. A three-way valve comprising a generally circular hollow plug, a tubular body around said plug, said plug being rotatable within said body, said body having three spaced apart openings in its side for permitting fluid flow therethrough, the first and second of said openings serving as a fluid inlet and a fluid outlet, respectively, and said first and second openings being located on opposite sides of said tubular body, the third of said openings serving both as a fluid inlet and outlet, said plug having four spaced apart apertures in its side for permitting fluid flow therethrough, the first and second of said four apertures being on opposite sides of said plug, said second aperture comprising a pair of concentric flow ducts the inner one of which is tapered and having its smaller diameter adjacent the outer periphery of the plug to provide suction when fluid passes through said first and second apertures of the plug from said first opening of the tubular body to said second opening of the tubular body, the third aperture of said plug being positioned adjacent said third opening of said body when said first and second openings of said body are aligned with said first and second apertures of said plug, the fourth aperture of said plug being positionable adjacent said third opening of said body and when so located the said first and second apertures of said plug communicate with solid portions of said tubular body side and when said fourth aperture is so positioned the third aperture of said plug being located adjacent the first opening of said tubular body thereby to enable fluid flow from said first opening of said body through said plug and through said third opening of said body.

2. The valve of claim 1 in which said plug has a central passageway communicating with the said four apertures.

3. The valve of claim 2 in which the said first plug aperture is nozzle shaped with a constricted opening to the central passageway.

References Cited by the Examiner

UNITED STATES PATENTS

| 1,491,115 | 4/1924 | Taylor | 137—625.47 XR |
| 1,889,231 | 11/1932 | Wahlbom | 137—625.47 XR |

FOREIGN PATENTS 536,553  12/1955  Italy.

M. CARY NELSON, *Primary Examiner.*